Patented Jan. 15, 1924.

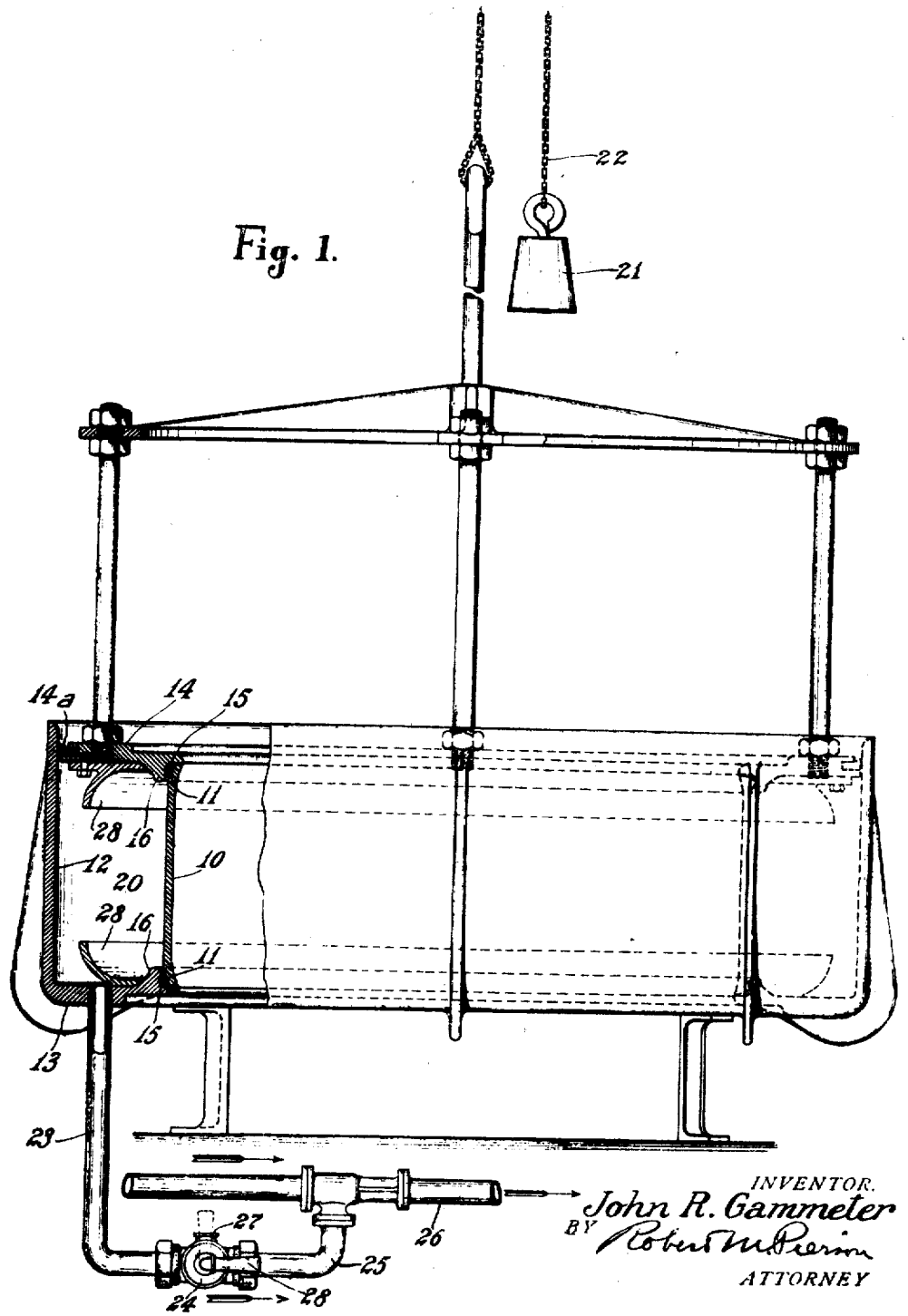

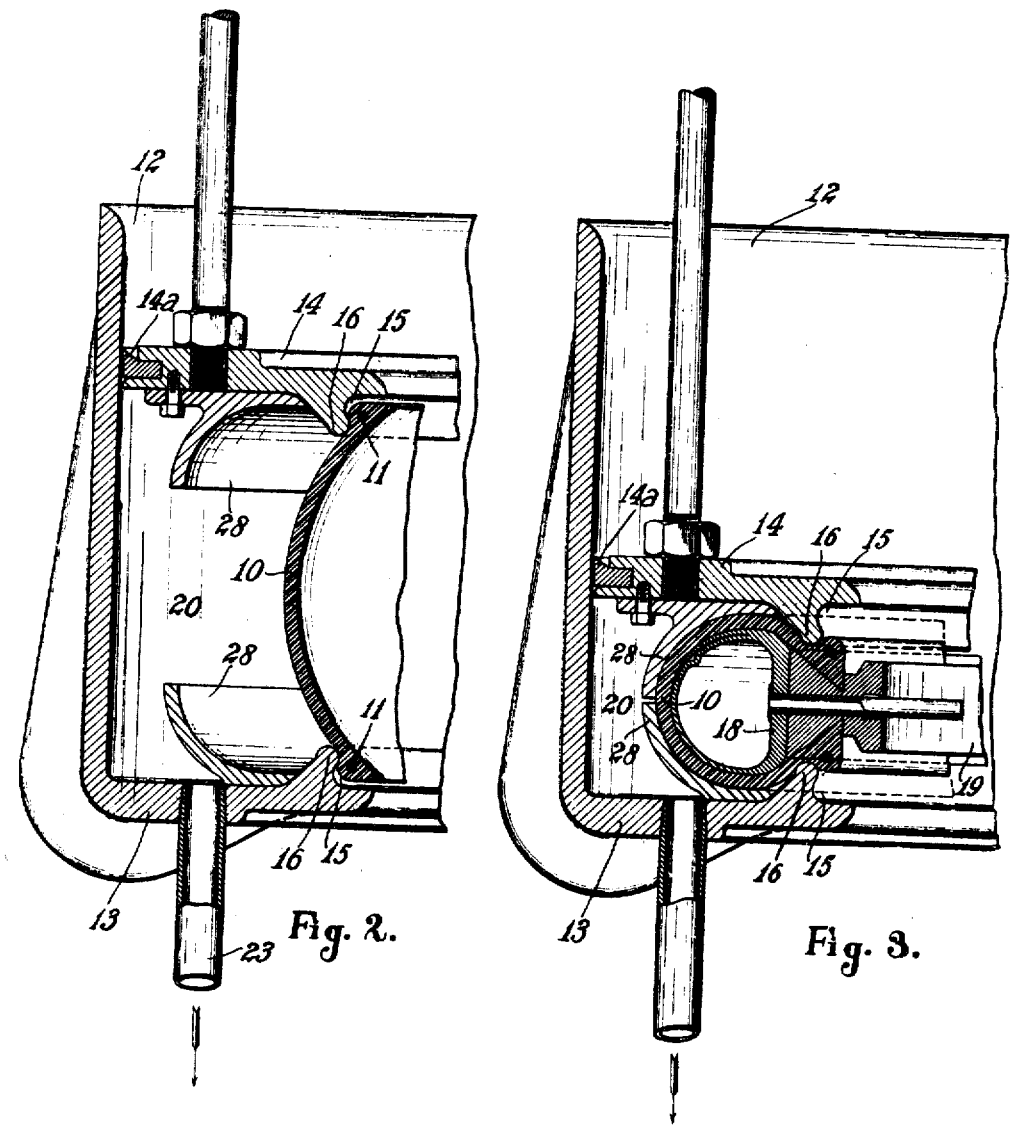

1,480,719

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING OR MANIPULATING TIRES.

Application filed June 15, 1920. Serial No. 389,171.

*To all whom it may concern:*

Be it known that I, JOHN R. GAMMETER, a citizen of the United States, residing at Akron, in the county of Summit, and State of Ohio, have invented a certain new and useful Method and Apparatus for Making or Manipulating Tires, of which the following is a specification.

This invention relates to the art of making or manipulating tire casings, the apparatus illustrated in the accompanying drawings being adapted, for example, to form tire casings by the method of distending the middle of an endless band while moving its edge portions together. My object is to provide a cheaper and quicker process of this type than those heretofore in use, and to furnish a simple and effective apparatus for this and analogous manipulations of tire casings.

Of the accompanying drawings:

Fig. 1 is a side elevation, partly in section, showing a machine embodying and adapted to carry out my invention, with a beaded tire-making band in position therein, ready to be formed into tire shape.

Fig. 2 is an enlarged sectional view of a portion of the machine showing the band partly shaped.

Fig. 3 is a view similar to Fig. 2 but showing the band fully shaped, and a watertube and bull-ring inserted therein.

In these drawings, 10 is an endless tireforming band which may be either the carcass-forming plies made of bias-laid threads or cords, or bias-cut woven fabric, with bead cores 11 incorporated in its edges, or it may be a complete tire-forming band having the breaker, bead-finishing strips, rubber tread, fillers and side-wall strips mounted on the carcass. This band is given the torus shape of a tire by applying differential fluid pressure to its inner and outer surfaces, preferably by means of a vacuum on its outer surface, to stretch outwardly the middle portion of the band lying between the bead cores while supporting the band by its re-enforced edges and moving these edges toward each other.

For this purpose I provide an annular cylinder 12 having a fixed lower end wall or head 13 on which the band 10 is placed in a horizontal position, the top of the cylinder being open to receive a piston 14 movable vertically therein. The edge of the piston carries a soft lip-packing ring 14ª. The piston and the cylinder head have large central openings through one of which, preferably the upper, the band may be inserted into the cylinder, and around these openings on the inner surfaces of the piston and cylinder head are formed annular grooves 15 and bead-seat members 16 which hold the edges of the band in parallel, axially-aligned positions during the shaping of the band into tire form. The members 16 enter the grooves above the tire beads in a casing of the clincher type, and they may be suitably varied in shape for straightbead casings.

When the band is placed in the cylinder, as shown in Fig. 1, it forms with the latter and the piston an annular, substantially fluid-tight chamber 20, whose upper wall is freely movable under differential pressures on its upper and lower surfaces. This upper wall or piston is normally held in a retracted position by a weight 21 and suitable connections between the weight and piston, including a chain 22 passing around an overhead pulley (not shown).

23 is a pipe connecting the cylinder with one end of a common form of three-way valve 24, which is connected at its opposite end to a pipe 25 leading to a suction pipe 26. In the top of the valve is an opening 27 to the atmosphere. A valve-controlling handle 28 may be turned to the horizontal position shown in Fig. 1 to close the opening 27 to the atmosphere and open communication between the cylinder and suction pipe to exhaust air from the chamber 20 and create a difference in the pressures on the two sides of the band and piston. The handle may also be turned to the vertical broken-line position shown in Fig. 1 to cut off communication with the suction pipe, and permit a flow of air from the atmosphere through the opening 27 into the cylinder to equalize the pressures on the inside and outside of the latter.

On the lower side of the piston 14 and upper side of the cylinder head 13 are mounted annular rigid members 28 which meet at their outer edges when the piston is in its lowest position, and form an expansion-limiting gauge having a channel substantially U-shaped in cross-section, the outer circumference of the channel being equal to the outer circumference of the tire to be formed. The apparatus may be operated without this gauge, but its use permits a rapid stretching of the band without danger of over-stretching of the latter or unevenly stretching the different parts of the band.

In Fig. 3 I have shown in the formed tire a water-tube 18 of a type adapted to expand the tire against its mold during vulcanization, and a tube-seating and bead-molding ring or "bull-ring" 19 of ordinary type (preferably segmental), but do not confine myself to the use of such devices, or of internal molding devices of this particular form, in connection with the present invention.

When operating the apparatus, a tire-forming band 10 is inserted through the central opening of the cylinder or piston, and placed in a horizontal position with its edges lying in the grooves 15. The valve handle 28 is then turned to its horizontal position to create a vacuum in the cylinder. The pressure of the atmosphere on the top of the piston moves the latter rapidly downward at the same time that said pressure on the inner side of the band stretches its middle progressively outward, readjusting the relative positions of the cords in the raw rubber and partially forming the band into tire shape. The valve handle is now turned to its vertical position, permitting atmospheric air to fill the annular chamber and the weight 21 to raise the piston, the latter and the band then assuming substantially the positions shown in Fig. 2. The core formed by the water-bag 18 and bull-ring 19 is then placed on the inner side of the band. The shaping of the tire is then completed by opening the valve to exhaust air from the cylinder, the atmospheric pressure forcing the band outwardly until it contacts with the gauge 28, 28, and forcing the piston down until the bead-seat members 16 press the band edges against the core. The piston is then moved above the cylinder wall and the tire with its contained core is removed. If a complete tire has been shaped on the core, the tire is then ready for curing, but if the carcass only has been shaped, the latter is placed on a finishing stand where the tire tread, sidewall strips and other elements pertaining to the finishing of a tire are applied.

The foregoing steps and the character of the apparatus employed may be variously modified and applied to different uses without departing from my invention.

I claim:

1. The process of manipulating a tire casing which comprises applying suction to the outer surface thereof while subjecting the inner surface thereof to atmospheric pressure, and at the same time moving the bead portions of said casing relatively to each other, to change the form of the casing.

2. The process of forming a tire casing from an endless stretchable band which comprises stretching the middle of the band outwardly by maintaining atmospheric pressure upon the inner surface of the band while creating a vacuum on the outer surface thereof, and moving the edges of the band toward each other.

3. The process of forming a tire casing from an endless stretchable band having bead cores in the sides thereof which comprises applying suction to the outer surface of the band to stretch the middle part thereof outwardly, and moving the bead cores axially toward each other while maintaining the latter in parallel positions.

4. The herein-described process which comprises stretching the middle portion of an endless tire-forming bend outwardly by fluid pressure to partially shape the casing, inserting a core in the partially-formed casing, and further stretching the band by fluid pressure to the circumferential size desired, while forcing the edges of the band against the sides of the core.

5. The process of forming a pneumatic tire casing from an endless beaded band, which comprises stretching the band outwardly between its beads by applying differential fluid pressures to the opposite surface of the band while leaving the inner surface exposed, equalizing the pressures on the opposite surfaces to stop the stretching, inserting in the partially-formed casing a ring core on which the tire is to be vulcanized, stretching the band to final shape on said core by applying differential pressures to the opposite sides of the band, and forcing the beads of the casing against the core.

6. In an apparatus for stretching an endless band into a tire, means for supporting the band by its edge portions and moving these portions axially of the band, and means for applying suction to the outer surface of the band to stretch the middle portion thereof outwardly.

7. In an apparatus for distending the middle portion of an endless band, the combination of means for supporting the band by its edge portions only, leaving the inside of the middle portion of the band exposed to atmospheric pressure, and means for creating a partial vacuum on the outside of the said middle portion.

8. An apparatus for distending endless bands into tire casings, comprising a cylinder, a piston movable therein, means on the cylinder and piston for supporting the band by its edge portions, leaving the middle portions of the band exposed to fluid pressure, and means for simultaneously stretching the middle portion of the band outwardly and moving the piston in the cylinder to partially close the open side of the stretched band.

9. An apparatus for distending endless bands into tire casings comprising a cylinder, a piston movable therein, one of said members having an opening permitting the placing of the band in the cylinder, means on the piston and cylinder for supporting the band with its inner surface exposed to atmospheric pressure, and means including an outlet in the cylinder for reducing the pressure within the latter, the normal atmospheric pressure on the band and piston stretching the former outwardly and moving the latter inwardly of the cylinder.

10. An apparatus for distending endless bands into tire casings, comprising a vertical cylinder having its upper end open, a piston movable downwardly into the cylinder, means including axially aligned bead seat members carried by the piston and cylinder for supporting the band by its edge portions and moving the upper edge portion axially of the band, said piston being movable inwardly of the cylinder under an excess of pressure on the upper surface thereof, and means for exhausting air from the cylinder, the preponderance of air pressure on the top of the piston and inside of the band moving the piston downwardly and stretching the middle portion of the band outwardly.

11. In an apparatus for stretching an endless band into a tire casing, means for supporting a band by its edge portions and moving these portions axially of the band, means for causing differential fluid pressures upon the opposite surfaces of the band to stretch the middle portion thereof outwardly, and means for limiting the outward stretching of the said middle portion.

12. The method of manipulating a tire casing which comprises forming a fluid seal against the bead portions of the casing, applying a vacuum to the outer surface of the casing, and moving said bead portions relatively to each other while said vacuum is maintained to change the form of said casing.

13. Apparatus for manipulating a tire casing comprising a pair of telescoped members forming an annular chamber adapted to contain a tire casing, means on each of said members for forming an annular seal against the respective bead portions of said casing, and means for applying a vacuum to said chamber.

14. Apparatus for manipulating a tire casing comprising a pair of telescoped members forming an annular chamber adapted to contain a tire casing, means on each of said members for forming an annular seal against the respective bead portions of said casing, means for applying a vacuum to said chamber, and means for moving said telescoped members relatively to each other.

15. Tire-manipulating apparatus comprising means adapted to engage the bead portions of an annular tire member and therewith to form an annular chamber, said tire member constituting the inner wall of said chamber, parts of said bead-portion-engaging means being adapted to be moved relatively to each other to change the shape of said chamber, and means for reducing the air pressure in said chamber.

16. Tire-manipulating apparatus comprising means adapted to engage the bead portions of an endless band of tire building material and therewith to form an annular chamber, said endless band constituting the inner wall of said chamber, parts of said bead-portion-engaging means being adapted to be moved axially toward each other to change the cross-sectional shape of said chamber, means for reducing the air pressure in said chamber, and yielding means adapted to resist the movement of the aforesaid parts toward each other.

17. The process of forming a tire casing from an endless band, which comprises distending the middle portion of the band by creating differential fluid pressures on the opposite faces thereof and moving the edge portions of the band toward each other, the fluid acting directly against the faces of the band.

18. In an appartus for forming a tire casing from an endless band, means for supporting the band by its edge portions and moving these portions relatively axially of the band and means for creating differential fluid pressures on the opposite faces of the band, to distend the middle portion thereof, the fluid acting directly against the faces of the band.

19. In an apparatus for forming a tire casing from an endless band having beaded edge portions, means for engaging and making fluid-tight connections with the bead portions of said band to form a fluid-tight chamber whereof one wall is formed by the band, parts of said bead-portion-engaging means being relatively movable to permit the beaded edge portions of the band to approach each other, and means for creating a fluid pressure condition within said chamber different from atmospheric pressure.

In witness whereof I have hereunto set my hand this 9th day of June, 1920.

JOHN R. GAMMETER.

DISCLAIMER 1,480,719.—*John R. Gammeter,* Akron, Ohio. METHOD AND APPARATUS FOR MAKING OR MANIPULATING TIRES. Patent dated January 15, 1924. Disclaimer filed June 24, 1936, by the assignee, *United States Rubber Company.*

Hereby enters this disclaimer to claim 17 of said patent.
[*Official Gazette July 28, 1936.*]